US005483269A

United States Patent [19]

van Stiphout et al.

[11] Patent Number: 5,483,269

[45] Date of Patent: Jan. 9, 1996

[54] PROCESS FOR THE PREPARATION OF AN IMAGE FORMING ELEMENT AND RELATED PRINTING DEVICE

[75] Inventors: Johannes G. V. van Stiphout, Beek en Donk; Cornelis A. M. Huyzer; Edwin J. Buis, both of Venlo; Hans E. Opbroek, Baarlo, all of Netherlands

[73] Assignee: Océ - Nederland, B.V., Venlo, Netherlands

[21] Appl. No.: 141,217

[22] Filed: Oct. 26, 1993

[30] Foreign Application Priority Data

Oct. 30, 1992 [NL] Netherlands ........................... 9201892

[51] Int. Cl.[6] ............................... B41J 2/06; G01D 15/06

[52] U.S. Cl. ............................ 347/55; 347/148; 347/153

[58] Field of Search ................................ 346/138, 153.1, 346/155, 160.1, 159; 347/55, 112, 148, 153

[56] References Cited

U.S. PATENT DOCUMENTS

| | | | |
|---|---|---|---|
| 3,946,402 | 3/1976 | Lunde | 346/153.1 |
| 4,559,545 | 12/1985 | Iemura et al. | 346/155 |
| 4,728,971 | 3/1988 | Vvn Stiphout et al. | 346/155 |
| 4,748,464 | 5/1988 | Pannekoek et al. | 346/155 |
| 4,792,860 | 12/1988 | Kuehnle | 358/300 |

FOREIGN PATENT DOCUMENTS 0247699 12/1987 European Pat. Off. .

*Primary Examiner*—Peter S. Wong
*Assistant Examiner*—Randy W. Gibson
*Attorney, Agent, or Firm*—Birch, Stewart, Kolasch & Birch

[57] ABSTRACT

An image-forming element including a cylinder having at its outer periphery a dielectric surface layer and, beneath the surface layer, a number of electrodes insulated from one another, the electrodes being connected to elements within the cylinder for selectively controlling the electrodes in accordance with an image pattern to be formed, this connection being established by securing in at least one opening in the wall of the cylinder control device which, on the one hand, are connected to electronic control components within the cylinder and, on the other hand, are connected to the electrodes on the periphery of the cylinder. An image-forming element thus prepared can be used in a printing device for reproducing information.

7 Claims, 2 Drawing Sheets

PROCESS FOR THE PREPARATION OF AN IMAGE FORMING ELEMENT AND RELATED PRINTING DEVICE

BACKGROUND OF THE INVENTION

FIELD OF THE INVENTION

The instant invention relates to an information reproducing system and, more specifically, to a process for the preparation of an image-forming element and related printing device.

DISCUSSION OF RELATED ART

There is described in EP-B-0 247 699 a process for preparing a printing device which describes making a connection between the electronic components of the control means and the image-forming electrodes of the device by connecting separate connecting wires extending from the control means via the sides of the cylinder to control electrodes extending in the axial direction of the cylinder. These control electrodes are situated on the outer surface of the cylinder beneath the image-forming electrodes and are separated therefrom by an insulating layer. One image-forming electrode in each case is conductively connected to one control electrode in each case by conductive paths in the intermediate insulating layer. This connecting method, however, has the disadvantage that the connecting circuit between the control means and the image-forming electrodes comprises a number of transitions between connecting elements which, as known from electronics, always incurs the risk of a poor electrical connection. A poor connection of this kind could cause defective control of one or more image-forming electrodes and hence distortion of the image to be formed. Moreover, fitting the control electrodes to the image-forming cylinder and making the conductive paths between the control electrodes and the image-forming electrodes are complex and expensive in terms of manufacture.

SUMMARY OF THE INVENTION

Therefore, it is an object of the present invention to provide a printing device which will overcome the above noted disadvantages.

A further object of the present invention is to provide a process for the preparation of an image-forming element of a printing device for reproducing information.

Still a further object of the present invention is to provide an image forming element for a printing device.

The foregoing objects and others are accomplished in accordance with the present invention, generally speaking, by providing an image forming element comprising a cylinder having at its outer periphery a dielectric surface layer and, beneath the surface layer, a number of electrodes insulated from one another, these electrodes being connected to a means within the cylinder for selectively controlling the electrodes in accordance with an image pattern to be formed. In the wall of the cylinder at least one elongated opening is formed, the longitudinal direction thereof extending substantially in the axial direction of the cylinder. In each elongated opening a control means is fitted comprising electronic control components and a support, on which support there are disposed electrode paths insulated from one another, the first ends of the electrode paths connected to the electronic control components being situated within the cylinder while the second ends of the electrode paths are situated at the outer periphery of the cylinder.

Over the second ends of the electrode paths, image-forming electrodes are provided which extend in the peripheral direction of the cylinder and which are insulated from one another. As a result, there is only one connection in the connecting circuit between the control means and the image-forming electrodes, which involves simply connecting electrode paths to one another. Moreover, the above-described preparation process opens the way to the use of a conventional commercially available metal core substrate as a support for the control components and as a support for the pattern of control electrodes which control electrodes become connected to the image-forming electrodes.

The invention also relates to a printing device for reproducing information, comprising a movable image-forming element prepared by the process according to the invention.

BRIEF DESCRIPTION OF THE DRAWINGS

The invention will be explained in detail with reference to the following description and accompanying drawings wherein.

DETAILED DISCUSSION OF THE INVENTION

Figure 1:
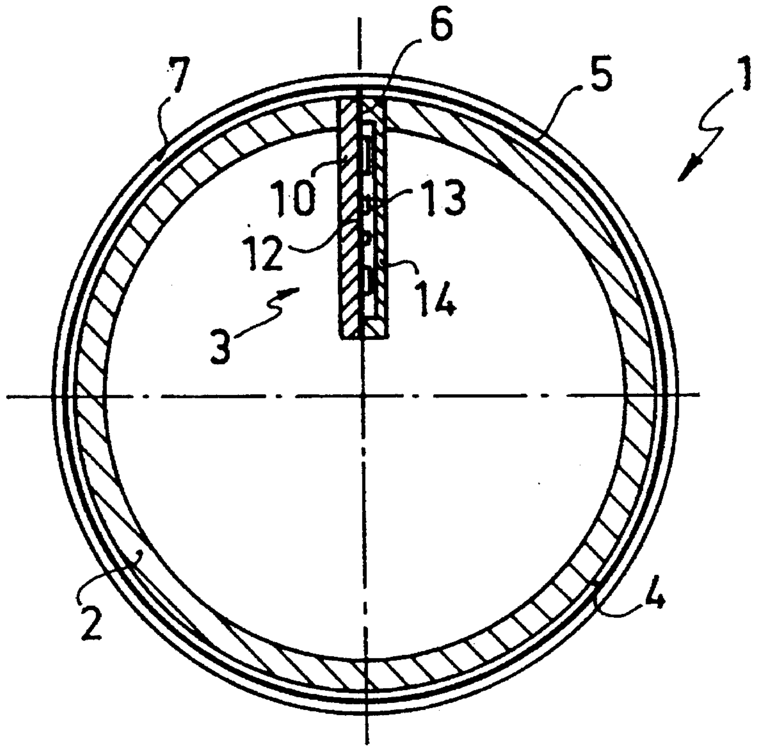
FIG. 1 is a cross-section of a first embodiment of an image-forming element prepared by the process according to the present invention.

The image-forming element 1 shown in FIG. 1 comprises a cylinder 2 having disposed therein an axially extending control element 3 having a construction which will be described in detail hereinafter. The cylinder 2 is covered with an insulating layer 4 on which image- forming electrodes 5 are disposed, such electrodes extending in the form of endless paths parallel to one another with mutually equal spacing in the peripheral direction of the cylinder 2. The image-forming electrodes 5 each are conductively connected to one of the control electrodes 6 of the control element 3. The number of control electrodes 6 of the control element 3 is equal to the number of image-forming electrodes 5, such number determining the images to be formed on the image-forming element Image quality improves with increasing electrode density. To achieve good quality, the number of image-forming electrodes 5 should be at least 10 per mm and preferably 14 to 20 per mm. According to one specific embodiment, the number of image forming electrodes 5 is equal to 16 per mm, the electrodes 5 having a width of 40 αm and the distance between the electrodes being about 20 αm.

The pattern of image-forming electrodes 5 is finally covered with a smooth dielectric layer 7. Thus, the electrodes 5 and 6 are completely insulated from one another and from the cylinder 2 apart from the conductive connection of each electrode pair. The control element 3 comprises a support 10 provided with an electrically conductive metal layer (such as copper) in known manner, the metal layer being converted to the required conductive track pattern 12 in the manner to be described hereinafter. The track pattern 12 consists, on the one hand, of the conductive connections between the various electronic components 13 of the control element 3 and, on the other hand, the control electrodes 6 each conductively connected to one of the image-forming electrodes 5.

Finally, the control element 3 also comprises a cover 14 connected to the support 10 in a manner known per se (e.g. by gluing), so as to form the box-shaped control element 3 containing the electronic components. The two functions of the cover 14, to protect the electronic components and insulate the control electrodes 6 from the cylinder 2, can, however, be performed with the same result by means of an insulating layer, e.g. an epoxy varnish layer, applied over the components 13. The electronic components 13 comprise a number of integrated circuits (i.c's) known, for example, from video display technology, comprising a series-in parallel-out shift register, an output register and, connected thereto, drivers having a voltage range of 25 to 50 volts, for example. Each control electrode 6 is connected to a driver of one of the integrated circuits.

The image-forming element 1 can be prepared, as follows, by the process according to the invention.

To make the control element 3, a metal support plate 10 is used (e.g. of aluminum), to which there is applied, in a known manner, an electrically conductive metal layer (e.g. copper), for example by vapor-coating, laminating or electroplating, the electrically conductive metal layer being insulated from the support plate 10. Preferably, however, a metal core substrate is used, which consists of a metal support plate to which a copper foil is glued by means of a suitable epoxy resin, e.g. the electronic grade epoxy resins especially developed for the electronics industry. A commercially available support plate of this kind is, of course, cheaper than a support plate especially made for this purpose. The electrically conductive metal layer is then converted to a conductive track pattern 12, for example by means of a known photo etching technique, the track pattern including both the conductive connecting paths for the electronic components 13 to be disposed on the support 10, and the conductive paths of the control electrodes 6. The next steps in making the control element 3 consist of fitting the electronic components 13 at the correct place on the support 10 as determined by the conductive connecting paths, and fitting the cover 14. The latter is connected to the support 10, for example, by a glue connection, for which an epoxy resin can again be used. The box-shaped control element 3 made in the manner described above is then placed in an axial slot formed in the wall of the cylinder 2, the slot being, for example, milled in the cylinder. The axial slot is at least as long as the working width of the image-forming element 1. The control element 3 can be formed from one element of a length equal to the working width but it can alternatively be built up from a number of modular control elements 3 which together cover the complete working width.

In an alternative embodiment of the image-forming element 1 a number of axial slots, each covering a part of the working width of the image-forming element 1, are formed in the wall of the cylinder 2 at locations which are distributed over the periphery of the cylinder 2. Modular control elements 3 are then positioned in these axial slots and electrically connected to each other in order to jointly cover the complete working width of the image-forming element 1.

In positioning the control element 3, it is of course essential to have accurate positioning axially to enable the image-forming electrodes 5, which are to be fitted subsequently by reference to the position of the control electrodes 6, to be exactly located. In the case of a modular control element 3, the modules must also be aligned with respect to one another. These positioning and alignment steps can be carried out in manners known to the skilled artisan. Subsequent fixing of the control element 3 in the cylinder 2 is preferably effected by gluing by means of the above-mentioned epoxy resin. With regard to the width of the axial slot in the cylinder 2 it may be stated that the space between the control element 3 and the wall of the slot must be so dimensioned that the space can be filled by the glue by capillary action. Too large a space results in the glue running out. The outer surface of the cylinder 2 with the control element 3 fixed therein is then turned to a predetermined dimension and brought into contact with a suitable etching liquid (e.g. a known alkaline potassium ferricyanide solution) so that the metal of the top layer of both the cylinder 2, support 10 and the cover 14 is etched away over a specific depth of, for example, 150 αm. The etching liquid is so selected that the metal of the control electrodes 6 is only slightly attacked, so that the ends of these electrodes finally project approximately 150 αm above the surface of the cylinder 2 and the control element 3.

However, it is also possible to omit the above-described etching operation. In that case, in making the control element 3, it is necessary to fit the electrically conductive metal layer, in which the track pattern 12 with the conductive paths of the control electrodes 6 is formed, with a projection of about 150 αm on the support plate 10. In this way, too, the ends of the control electrodes 6 then project about 150 αm above the surface of the cylinder 2 after the control element 3 has been placed in the cylinder 2. The surface of the cylinder 2 is then covered with an insulating intermediate layer 4 having a thickness equal to the length of the projecting ends of the electrodes 6, so that the end faces thereof are situated at the outer surface of the insulating intermediate layer 4. The same end result is achieved by applying a thicker intermediate layer 4 and then turning this layer until the end faces of the electrodes 6 are exposed at the surface of the intermediate layer 4. A suitable material for this insulating intermediate layer 4 is the above-mentioned electronic grade epoxy resin.

The image-forming electrodes 5 are formed by providing (e.g. on a lathe) in the outer surface of the intermediate layer 4 a number of endless grooves peripherally extending parallel to one another. The groove pattern is so disposed that it corresponds completely (in respect of density and location) to the pattern of control electrodes 6, so that one control electrode co-operates with one groove in each case. The grooves are filled with electrically conductive material, e.g. carbon binder material, thus completing the conductive image-forming electrodes 5.

In addition to the above-described process for forming the pattern of image-forming electrodes 5, an alternative process may also be used. In this, an electrically conductive metal layer (e.g. copper) is applied to the intermediate layer 4, such application being in known manner, e.g. by vapor coating or electroplating. The image-forming electrodes 5 extending in the peripheral direction of the cylinder 2 are then formed from this metal layer, e.g. by using a known photo-etching technique, by burning in with a laser beam or by machining. Of course, the electrode pattern is so formed that each image-forming electrode 5 makes contact with the end face of one control electrode 6.

Instead of applying a layer of epoxy resin for making the insulating intermediate layer 4, this insulating layer can be produced much more simply by oxidizing the top layer of the cylinder 2 to form an electrically insulating metal oxide layer (e.g. aluminum anodization). The pattern of the image-forming electrodes 5 can then be applied to this metal oxide layer in one of the ways described hereinabove.

The pattern of image-forming electrodes 5 is finally covered with a smooth dielectric layer 7, so that the image-forming electrodes 5 are completely insulated from one another. This dielectric top layer 7 preferably has a thickness of only some tenths of a micrometer (e.g. 0.2–0.8). Suitable dielectric materials for forming the layer 7 are known from microelectronics, inter alia.

There has been described above one embodiment of an image-forming element 1 with a control element 3, in which one control electrode 6 co-operates each time with one image-forming electrode 5 at the periphery of an image-forming element 1. Alternatively, however, a number of control elements 3 can be accordingly distributed over the periphery in different openings in the cylinder 2, in which case each control element 3 cooperates with a number of image-forming electrodes 5. Thus, for example, in a situation having four control elements 3 distributed over the periphery of the cylinder 2, the control electrodes 6 of each control element 3 are connected only to one-quarter of the image-forming electrodes 5. In this case the construction is such that the first control electrode 6 of the first control element 3 is connected to the first image-forming electrode 5, the first control electrode 6 of the second control element 3 is connected to the second image-forming electrode 5, and so on, after which the second control electrode 6 of the first control element 3 is connected to the fifth image-forming electrode 5, and so on.

Figure 2:
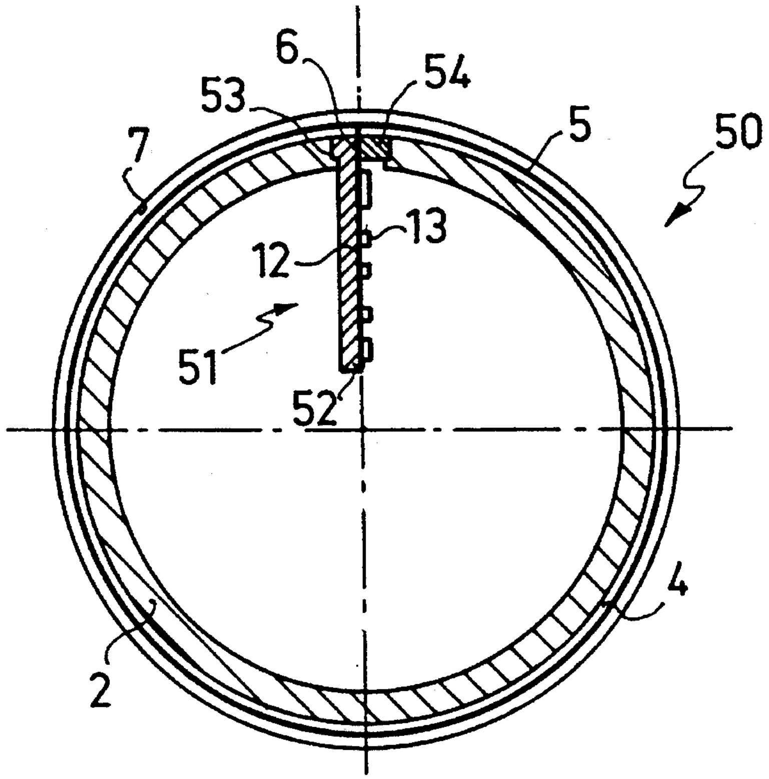
FIG. 2 is a cross-section of a second embodiment of an image-forming element prepared by the process according to the present invention.

FIG. 2 represents a second embodiment of an image-forming element prepared by the process according to the instant invention. This image-forming element 50 is completely identical, except for the control element 51, to the image-forming element 1 as described with reference to FIG. 1, so that elements having the same functions have been given like references. The control element 51 differs from the control element 3 in FIG. 1 only in respect of an adapted construction comprising a different form of being fixed in the axial slot in the cylinder 2, the slot also being adapted to this configuration. For this purpose, the support plate 52 of the control element 51 is provided with a projecting edge 53 at the end to be secured in the cylinder 2, while an auxiliary member 54 is secured to the opposite surface of the support plate 52. Auxiliary member 54, which consists of a strip in rectangular cross-section, extends over the complete length of the control element 51 and is secured by gluing (e.g. by epoxy resin) to that surface of the support plate 52 which is provided with the control electrodes 6. The resulting control element 51 is then secured, in the same way as described hereinbefore with respect to control element 3, in the axial slot in the cylinder 2, the slot being step- shaped in this case. In a similar manner to the situation in the case of control element 3, the electronic components 13 can be protected by a cover (not shown in detail) or an insulating epoxy layer.

After the control element 51 has been secured in the cylinder 2, the latter is then provided, in the same manner, with insulating layers 4 and 7 and image-forming electrodes 5 as described with respect to the imageforming element 1. Other variants, such as a modular construction and a number of control elements distributed over the periphery of the cylinder 2, are also possible in this embodiment.

Figure 3:
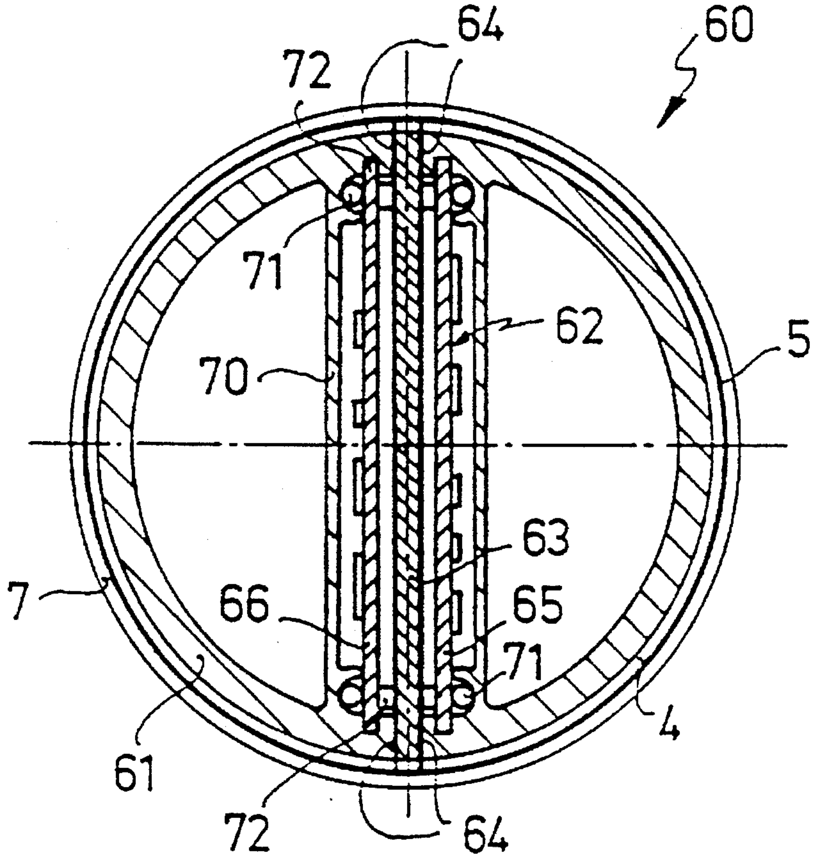
FIG. 3 is a cross-section of a third embodiment of an image-forming element prepared by the process according to the present invention.

A third embodiment of an image-forming element according to the invention is shown in FIG. 3. The image-forming element 60 comprises a cylinder 61 with an axially extending control element 62 secured therein and having a construction to be described hereinafter. In the same way as described in connection with the image-forming elements 1 and 50, the cylinder 61 is covered by an insulating layer 4 to which endless image-forming electrodes 5 are applied and which are finally covered with a smooth dielectric layer 7. The control element 62 comprises a support plate 63 provided with a pattern of control electrodes 64 (similar to control electrodes 6) on both sides and two printed circuit boards (PCB's), 65 and 66, to which the electronic components of the control element 62 are fitted. The support plate 63 can be made in similar manner to the support plate 10 of control element 3 either by applying a conductive metal layer (e.g. copper) to both sides of a metal plate by vapor-coating, laminating or electroplating, or by the use of a double-sided metal core substrate, the conductive layers of which are converted to control electrodes 64 by a known photo-etching technique. This support plate 63 is then placed in two diametrically opposite slots in the cylinder 61 and secured therein by means of a suitable glue, e.g. the epoxy-resins mentioned hereinbefore.

The insulating layers 4 and 7 and the image-forming electrodes 5 are then applied, the production process, including the possible variants, being identical to the process as described with reference to the image- forming element 1. The PCB's 65 and 66 are then pushed axially into an assembly structure 70 disposed centrally in the cylinder 61 with the electronic components facing away from the support plate 63. In these conditions, the PCB's 65 and 66 are pushed in the direction of the support plate 63 by pressure means 71 (e.g. resilient pressure strips) whereafter electrical connection is established between the track pattern of the PCB's 65, 66 and the control electrodes 64 by contact means 72.

The embodiment illustrated in FIG. 3 is similar to the embodiment of the image-forming element 1 as described hereinbefore, with a number of control elements 3 being provided, distributed over the periphery. The electronic components are so distributed over the PCB's 65, 66, the connecting tracks between the electronic components so positioned, and the control electrodes 64 at the top part (seen in FIG. 3) of the support plate 63 electrically separated from the control electrodes 64 at the bottom part of the support plate 63, such that the control element 62 operates as four separate control elements, each cooperating with one-quarter of the image-forming electrodes 5. In this embodiment, the contact means 72 are so constructed that each contact of a PCB 65, 66 is connected to the corresponding control electrodes 64 on the support plate 63 and the connections are electrically insulated from one another. This can be done, for example, by zebra connectors.

Figure 4:
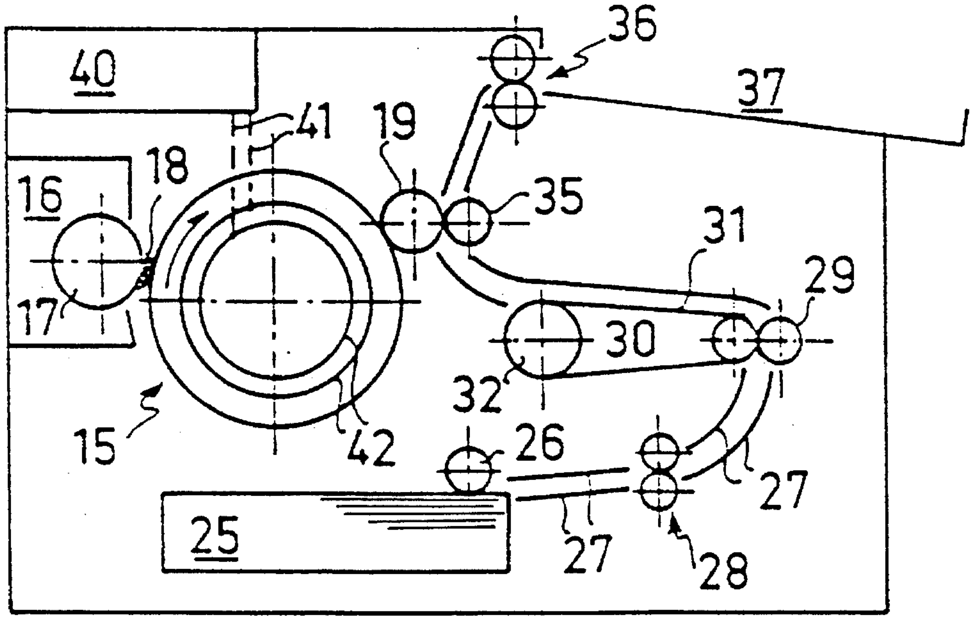
FIG. 4 is a schematic diagram of an electrostatic printer equipped with an image-forming element prepared in accordance with the present invention.

FIG. 4 diagrammatically illustrates a printer equipped with an image-forming element 15 according to the invention. A magnetic roller 17 comprising a rotatable electrically conductive non-magnetic sleeve and an internal stationary magnet system is located in an image-forming station 16 at a short distance from the surface of the image-forming element 15. The rotatable sleeve of the magnetic roller 17 is covered with a uniform layer of electrically conductive and magnetically attractable toner powder, which, in an image-forming zone 18, is in contact with the image-forming element 15. Application of a voltage between the magnetic roller 17 and one or more of the image-forming electrodes of the image- forming element 15 causes a powder image to be formed on the image-forming element 15. This powder image is transferred by pressure to a heated rubber-covered roller 19. A sheet of paper is taken from a stockpile 25 by roller 26 and fed via guideways 27 and rollers 28 and 29 to a heating station 30. The latter comprises a belt 31 running about a heated roller 32. The sheet of paper is heated by contact with the belt 31. The sheet of paper heated in this way is then fed through between roller 19 and a pressure roller 35, the softened powder image on roller 19 being completely transferred to the sheet of paper. The temperatures of the belt 31 and roller 19 are so adapted to one another that the image fuses to the sheet of paper. The sheet of paper provided with the image is then fed via conveyor rollers 36 to a collecting tray 37.

Unit 40 comprises an electronic circuit which converts the optical information of an original into electrical signals which are fed, via wires 41 having sliding contacts, and conductive tracks 42 in the side wall of the image-forming element 15, to the control elements 3, 51 or 62 connected to the tracks 42. The information is fed line by line serially to the shift register of the integrated circuits of the elements 3, 51 or 62. If the shift registers are completely full in accordance with the information of one line, that information is put in the output register and the electrodes 6, 5 are either energized or not by the drivers depending on the signal. While this line is being printed the information of the next line is being fed to the shift registers.

Apart from the optical information originating from an original, electrical signals originating from a computer or a data-processing device can also be converted in unit 40 to signals which are fed to the control elements 3, 51 or 62. In the printer according to FIG. 4, the electrically conductive magnetically attractable toner powder is fed by the magnetic roller 17 into the image-forming zone 18. It will be apparent that the toner powder can also be applied in a uniform layer to the image-forming element 15 and then be selectively removed therefrom in the image-forming zone 18 as described in U.S. Pat. No. 3,946,402.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for manufacturing an image-forming element comprising:

providing a cylinder having a wall with an outer peripheral surface, said wall of said cylinder having one or more elongated openings therein, said one or more openings having a longitudinal direction extending substantially in an axial direction of said cylinder, fitting in each of said one or more elongated openings a control element, each control element comprising at least one support, electronic control components and electrode paths which are insulated from one another, first ends of said electrode paths being connected to said electronic control components situated within said cylinder and second ends of said electrode paths being situated at the outer periphery of said cylinder, and forming over each of said second ends of said electrode paths an image-forming electrode which extends in a peripheral direction about said cylinder and which is insulated from other image forming electrodes, each image forming electrode being connected through one of said electrode paths with said electronic control components, thereby enabling said electronic control components to selectively energize said image forming electrodes in accordance with an image pattern to be registered.

2. A process according to claim 1, wherein said image forming electrodes are insulated from one another on said outer peripheral surface of said cylinder by applying to said outer peripheral surface of said cylinder an electrically insulating layer, forming a number of endless grooves extending peripherally about said cylinder parallel to one another, each second end of said electrode paths leading into a separate groove, and filling said grooves with an electrically conductive material to form said insulated image forming electrodes.

3. A process according to claims 1 or 2, further including securing said support of said control element in each of said one or more openings in said cylinder, and etching said outer peripheral surface of said cylinder to a specific depth in a manner whereby said second ends of said electrode paths are only partially etched away so that said second ends project above said surface of said cylinder.

4. A printing device for printing information comprising: a movable image forming element, comprising (i) a cylinder having a wall provided with one or more elongated openings having a longitudinal direction extending substantially in an axial direction of said cylinder, (ii) a control element positioned in each of said one or more elongated openings, said control element comprising a support, electronic control components and electrode paths which are insulated from one another, first ends of said electrode paths being connected to said electronic control components situated within said cylinder and second ends of said electrode paths being situated at the outer periphery of said cylinder, and (iii) a multiplicity of image forming electrodes insulated from one another, said image forming electrodes extending peripherally on said outer peripheral surface of said cylinder, each of said image-forming electrodes being connected to said second end of a different one of said electrode paths such that each of said image forming electrodes is selectively actuated by said electronic control components;

an image forming station in which a magnetic roller is disposed with a rotatable electrically conductive sleeve near a surface of said image forming element, so as to form an image forming zone, said magnetic roller having disposed within said sleeve magnetic means which generates a magnetic field in said image forming zone; and means for activating said electronic components of said control means to selectively actuate said image forming electrodes in accordance with an information pattern, while an electronically conductive, magnetically attractable toner powder is provided in said image forming zone, so as to attract said toner powder in image-wise configuration to said surface of said image-forming element.

5. An image-forming element comprising:

a cylinder having a wall with an outer peripheral surface said wall being provided with one or more elongated openings having a longitudinal direction extending substantially in an axial direction of said cylinder, a control element positioned in each of said one or more elongated openings, each control element comprising at least one support, electronic control components and electrode paths which are insulated from one another, first ends of said electrode paths being connected to said electronic control components situated within said cylinder and second ends of said electrode paths being situated at the outer periphery of said cylinder, and a multiplicity of image-forming electrodes insulated from one another extending peripherally on said outer peripheral surface of said cylinder, each of said image-forming electrodes being connected to a different one of said electrode paths.

6. The image-forming element of claim 5, wherein said cylinder is provided with a plurality (N) of said elongated openings distributed over said peripheral surface of said cylinder and control elements are provided in each of said elongated plurality of openings such that each separate control element cooperates with one Nth of said image-forming electrodes.

7. The image forming element of claim 5, wherein four control elements are provided distributed over said peripheral surface of said cylinder such that each separate control element cooperates with at least one-quarter of said image forming electrodes.

* * * * *